(No Model.)

W. BOULTON.
BICYCLE SADDLE.

No. 579,856.          Patented Mar. 30, 1897.

WITNESSES:

INVENTOR
W. Boulton.
BY
ATTORNEYS.

UNITED STATES PATENT OFFICE.

WILLIAM BOULTON, OF ALPENA, MICHIGAN.

BICYCLE-SADDLE.

SPECIFICATION forming part of Letters Patent No. 579,856, dated March 30, 1897.

Application filed February 19, 1896. Serial No. 579,939. (No model.)

*To all whom it may concern:*

Be it known that I, WILLIAM BOULTON, of Alpena, in the county of Alpena and State of Michigan, have invented a new and Improved Bicycle-Saddle, of which the following is a full, clear, and exact description.

The object of the invention is to construct a bicycle-saddle in a simple, durable, and economic manner and to provide a saddle which will give a maximum of ease to a rider, and which will be light and sightly.

A further object of the invention is to provide a saddle which will have a spring action throughout its entire area.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
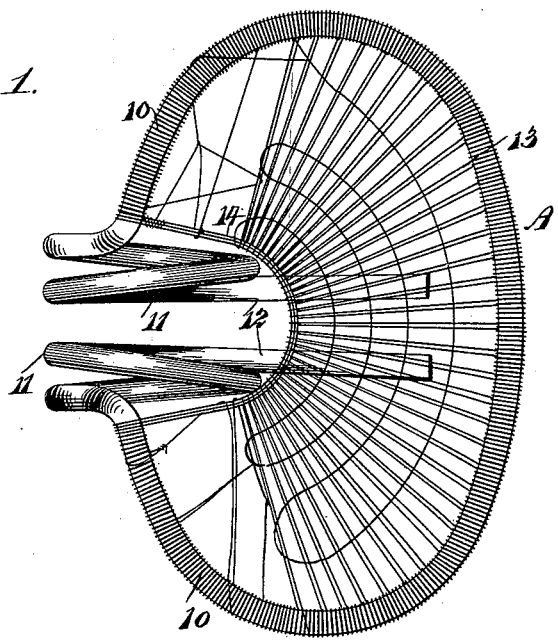
Figure 2:
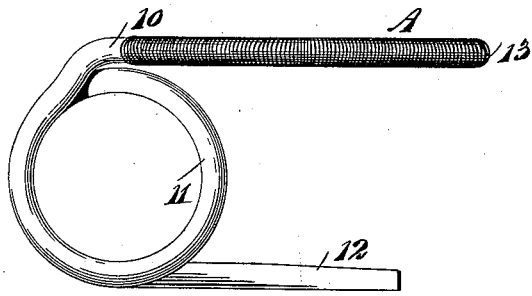
Figure 3:
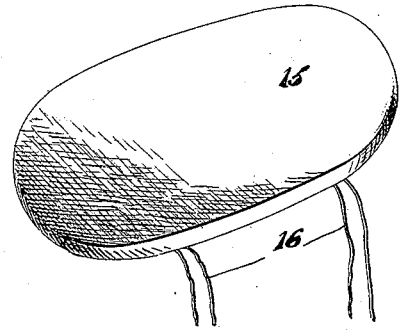

Figure 1 is a plan view of the improved saddle. Fig. 2 is a side view of the same, and Fig. 3 is a perspective view of a bed or cushion adapted for use in connection with the saddle.

The frame of the seat-section A of the saddle consists of a steel bar 10, which is preferably round in cross-section, and the said bar is bent ordinarily to a substantially oval shape, as shown in Fig. 1, but it may be pointed, pear-shaped, round, or may be made in other contours. The steel bar is continuous at the front and sides of the saddle, but at the rear central portion a space intervenes the terminals of the saddle-section of the bar, and the said bar is then carried down and formed into two coils 11, located in the aforesaid space, the seat proper being such a distance above the coils, as shown in Fig. 2, as to prevent the person of the rider contacting with the coils while riding over rough roads. After the steel rod or bar has been bent into the aforesaid coils 11 the ends of the rod are carried horizontally forward, forming two arms 12, to facilitate the attachment of the saddle to the saddle-post of the machine; but if in practice it is found desirable the two arms 12 may be merged into one at their front ends.

The frame of the saddle is provided with a covering or a bed 13, made of copper wire, leather, cane, or a woven flat steel wire or any equivalent of the same. Ordinarily, however, as shown in the drawings, a network of wire will constitute the aforesaid covering, and the said covering is attached to the sides and the front of the frame and at each side of the rear space in the frame, the covering being cut away to expose the coils 11, as shown at 14 in Fig. 1.

If in practice it is found desirable, a cushion 15 may be fitted to the saddle, and the said cushion may be made of any desirable material. Preferably, however, the cushion will be made of cloth, leather, or of rubber, and inflated, as shown in Fig. 3, being attached to the saddle through the medium of strings 16 or like fastening devices.

A saddle constructed as above set forth will be an easy-riding one, since the seat is absolutely spring-controlled, and the saddle, furthermore, will be very cool. The saddle is also durable, being made of but few parts, and it is simple and exceedingly economic in its construction.

Having thus described my invention, I claim as new and desire to secure by Letters Patent—

A bicycle-saddle, comprising a frame formed of a single rod bent in a horizontal plane to have an uninterrupted curved front portion and sides, each end of said rod being turned below the plane of the horizontal front and side portions and forming coils, said ends being finally carried horizontally forward, whereby arms for attachment to the saddle-post are formed, and a net-like covering woven around the front and sides of the frame and upon which the person of the rider is to rest, said covering being woven to expose said coils, as and for the purpose set forth.

WILLIAM BOULTON.

Witnesses:
   J. C. VIALL,
   GEO. M. HANNA.